United States Patent [19]

Von Kohorn

[11] Patent Number: 5,249,044
[45] Date of Patent: * Sep. 28, 1993

[54] PRODUCT INFORMATION STORAGE, DISPLAY, AND COUPON DISPENSING SYSTEM

[76] Inventor: Henry Von Kohorn, 945 Treasure La., Vero Beach, Fla. 32963

[*] Notice: The portion of the term of this patent subsequent to Jul. 7, 2009 has been disclaimed.

[21] Appl. No.: 878,642

[22] Filed: May 5, 1992

[51] Int. Cl.$^5$ .............................................. H04N 1/00
[52] U.S. Cl. ........................................ 358/86; 455/4.2; 455/6.3; 364/401; 358/85
[58] Field of Search ................. 358/84, 86, 85; 455/2, 455/4.1, 4.2, 6.3, 45, 66, 158.5, 186.1, 186.2; 364/403, 485, 401

[56] References Cited

U.S. PATENT DOCUMENTS

| | | | |
|---|---|---|---|
| 3,095,653 | 7/1963 | Corrigan | 35/9 |
| 3,546,791 | 12/1970 | Koos et al. | 35/9 |
| 3,599,221 | 8/1971 | Baer | 346/1 |
| 3,606,688 | 9/1971 | Zawels et al. | 35/9 R |
| 3,671,668 | 6/1972 | Reiffel | 178/6.8 |
| 3,810,627 | 5/1974 | Levy | 273/138 A |
| 3,848,082 | 11/1974 | Summers | 178/5.6 |
| 3,910,322 | 10/1975 | Hardesty, Jr. et al. | 340/172.5 |
| 3,964,179 | 6/1976 | Bennett | 35/31 R |
| 3,993,861 | 11/1976 | Baer | 178/5.6 |
| 3,999,307 | 12/1976 | Tsuda et al. | 35/9 A |
| 4,044,380 | 8/1977 | Justice et al. | 358/142 |
| 4,052,798 | 10/1977 | Tomita et al. | 35/9 A |
| 4,141,548 | 2/1979 | Everton | 273/1 E |
| 4,264,924 | 4/1981 | Freeman | 358/86 |
| 4,268,744 | 5/1981 | McGeary | 235/375 |
| 4,271,351 | 6/1981 | Bloodworth | 235/375 |
| 4,286,323 | 8/1981 | Meday | 364/411 |
| 4,329,684 | 5/1982 | Monteath et al. | 340/707 |
| 4,339,798 | 7/1982 | Hedges et al. | 364/412 |
| 4,377,870 | 3/1983 | Anderson et al. | 455/2 |
| 4,388,008 | 6/1983 | Greene et al. | 400/578 |
| 4,541,806 | 9/1985 | Zimmerman et al. | 434/258 |
| 4,573,072 | 2/1986 | Freeman | 358/86 |
| 4,592,546 | 6/1986 | Fascenda et al. | 273/1 E |
| 4,593,904 | 6/1986 | Graves | 273/1 E |
| 4,608,601 | 8/1986 | Shreck et al. | 358/146 |
| 4,611,996 | 9/1986 | Stoner | 434/202 |
| 4,630,040 | 12/1986 | Haertling | 340/763 |
| 4,671,772 | 6/1987 | Slade et al. | 434/219 |
| 4,745,468 | 5/1988 | Von Kohorn | 358/84 |
| 4,807,031 | 2/1989 | Broughton et al. | 358/142 |
| 4,833,710 | 5/1989 | Hirashima | 380/20 |
| 4,876,592 | 10/1989 | Von Kohorn | 358/84 |
| 4,896,791 | 1/1990 | Smith | 364/479 |
| 4,907,079 | 3/1990 | Turner et al. | 358/84 |
| 4,910,672 | 3/1990 | Off et al. | 364/405 |
| 4,926,255 | 5/1990 | Von Kohorn | 358/84 |
| 4,926,256 | 5/1990 | Nanba | 358/84 |
| 4,949,256 | 8/1990 | Humble | 364/401 |
| 4,972,504 | 11/1990 | Daniel, Jr. et al. | 455/2 |
| 5,034,807 | 7/1991 | Von Kohorn | 358/84 |
| 5,057,915 | 10/1991 | Von Kohorn | 358/84 |
| 5,063,610 | 11/1991 | Alwadish | 455/45 |
| 5,111,927 | 5/1992 | Schulze, Jr. | 100/9.2 |
| 5,128,752 | 7/1992 | Von Kohorn | 455/2 |

FOREIGN PATENT DOCUMENTS

| 1172847 | 8/1984 | Canada . |
| 1287304 | 8/1972 | United Kingdom . |
| 2120507A | 11/1983 | United Kingdom . |

OTHER PUBLICATIONS

Sync (catalog), pp. 2 and 3, Advertisement Titled "Now You Can Beat The Contestants on TV's Most Popular Game Show", 1988.
Rand Report No. R-88-MF, Baer, Nov. 1971.

*Primary Examiner*—Reinhard J. Eisenzopf
*Assistant Examiner*—Edward Urban
*Attorney, Agent, or Firm*—Perman & Green

[57] ABSTRACT

A system for generating product coupons at remote locations. The system includes an apparatus for receiving and storing product information signals broadcast from a central location. The apparatus is connected to a television at the remote location and has a coupon generating unit. The coupon generating unit can generate a product coupon having selectively entered product information thereon. The system further comprises a switch such that stored product information signals can be displayed on the television.

31 Claims, 3 Drawing Sheets

PRODUCT INFORMATION STORAGE, DISPLAY, AND COUPON DISPENSING SYSTEM

BACKGROUND OF THE INVENTION

1. Field of the Invention

The present invention relates to generating tokens or coupons having value. More specifically, the present invention includes a system and method that permits the generating and dispensing of tokens, such as product discount coupons, specified by individual members of a broadcast audience in remote locations, such as their homes, these individual members of the broadcast audience being potential shoppers or customers.

2. Prior Art

The current use of discount coupons has a serious drawback in that there is a substantially low rate of redemption of such coupons. Frequently there is only about a 2.5 to 4 percent redemption of the total number of coupons printed in newspapers, magazines, mailings, free-standing inserts, etc. This low rate of redemption significantly hinders the intended purpose of product coupons and the like; i.e.: to induce or encourage purchasers to buy a certain brand of product over other brands or, to encourage a potential purchaser to come to a specified seller's location rather than a competitor's location.

U.S. Pat. No. 4,910,672 to Off et al. discloses a system for creating discount coupons in response to the purchase of products. U.S. Pat. No. 4,949,256 to Humble discloses a coupon validation network. U.S. Pat. Nos. 4,745,468; 4,876,592; 4,926,255; 5,057,915; and 5,034,807 to Von Kohorn disclose various dispensing units intended to be used with television broadcasts.

SUMMARY OF THE INVENTION

In accordance with one embodiment of the present invention, a system for generating product coupons is provided. The system comprises broadcast means, a television at a remote location, an apparatus for receiving and storing product information signals, means for generating product coupons, and means for selectively displaying stored product information signals on the television. The broadcast means is located at a central location and is adapted to transmit electronic signals to remote locations of members of a broadcast audience. The signals include product information signals and television program signals. A television is located at each of the remote locations and has means for presenting the television program signals and product information signals. The apparatus for receiving and storing product information signals and for generating product coupons is connected to the television and comprises means for receiving the product information signals. The product information signals can be transmitted by cable, telephone, or broadcast over airwaves. The transmission can be initiated at a central location or upon a telephone request by an individual at a remote location. The apparatus can also include means for storing received product information signals. The system can also include a coupon generating unit. The coupon generating unit comprises means for selectively entering product information therein, and means for generating a product coupon having at least a portion of the selectively entered product information recorded thereon. The means for selectively displaying or otherwise presenting the stored product information signals on the television is selectively operable by individual members of the broadcast audience.

In accordance with another embodiment of the present invention, a system for generating coupons is provided comprising a television located at a remote location, means for receiving electronic product information signals transmitted from a central location, a storage device, means for selectively transmitting stored signals from the storage device to the television, and a coupon generating unit. The means for receiving electronic product information signals is located at the remote location. The storage device is connected to the means for receiving and has means for storing product information signals received at the means for receiving. The coupon generating unit is located at the remote location for generating coupons. The unit has means for selectively entering product information therein and for generating the coupons with product information thereon.

In accordance with another embodiment of the present invention, a system for selectively generating product coupons is provided. The system includes means for receiving and storing electronic signals transmitted from a central location; means for selectively transmitting product information stored in the means for receiving and storing to a television for presentation to the viewer; and a coupon generating unit located at the remote location. The unit has means for selectively entering product information therein and dispensing a product coupon with entered product information thereon.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

To facilitate an understanding of the terms used herein, the following definitions are provided.

The terms "redeem" and "redemption" are intended to include the presentation, delivery, surrender or other form of turning in a token, in person, by mail, or otherwise, in exchange for merchandise, discounts, prizes, cash vouchers or other consideration.

The term "token redemption data" is intended to include data specifying locations where tokens can be redeemed, dates or time limits during which tokens can be redeemed, and/or information to prevent fraud or cheating, such as verification data.

The term "consideration" is intended to include value whether monetary, commercial or symbolic.

The term "central" is intended to include a location or locations other than remote receiving locations such as a television transmission station or any transmitter serving an area of members of a broadcast audience.

The term "token" is intended to include hard copy records, coupons, certificates, magnetic cards and other records that can be redeemed.

The term "dispensing tokens" is intended to include the issuing, delivery or making available tokens to a member of the broadcast audience, whether mechanically or manually.

The term "matrix" is intended to include a substrate on which information may be provided, recorded or stored, for example electro-magnetically as in the case of magnetic cards, plastic film, or by printing as in the case of a paper matrix, etc.

The term "product information" is intended to include listings, specifications, prices, discounts and other information for a product or service including depiction by language or graphics.

The term "code" is intended to comprise alphanumeric and/or other indicia or symbols.

In the context of the present method the term "sponsor" is intended to include advertisers, broadcasters, sales outlets, manufacturers, and suppliers of goods and services.

Figure 1:
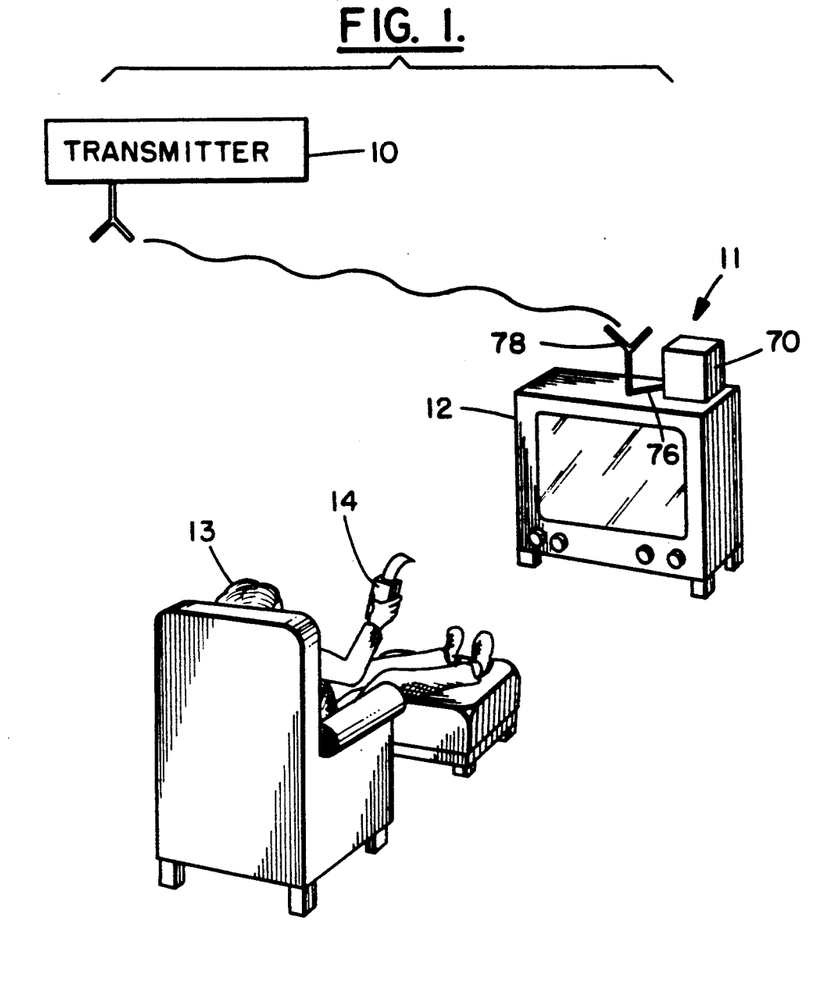
FIG. 1 is an illustrative view of a central station and remote location for use with the present invention.

Referring to FIG. 1, there is shown a diagrammatical view of a central transmitter 10 and remote location 11. Although the present invention will be described below with reference to a television broadcast, it should be understood that the invention is applicable to any type of broadcast including radio broadcast and closed circuit broadcasts. Generally, a television program is transmitted by standard broadcast facilities 10 and received at various remote locations 11 on standard television receivers 12. Receiver 12 can be any suitable type of receiver including a passive video display or a liquid crystal display. Viewers 13, which also constitute potential shoppers or customers, at the various remote locations 11 constitute a broadcast audience. The present invention includes providing generating units 14 at the remote locations 11 of the members 13 of the broadcast audience. Each generating unit 14 is intended to be self contained and individually operated by a viewer 13 to generate and dispense tokens or coupons 2 (See FIG. 3) to the viewer 13 in the convenience of the viewer's home.

Figures 2, 4A:
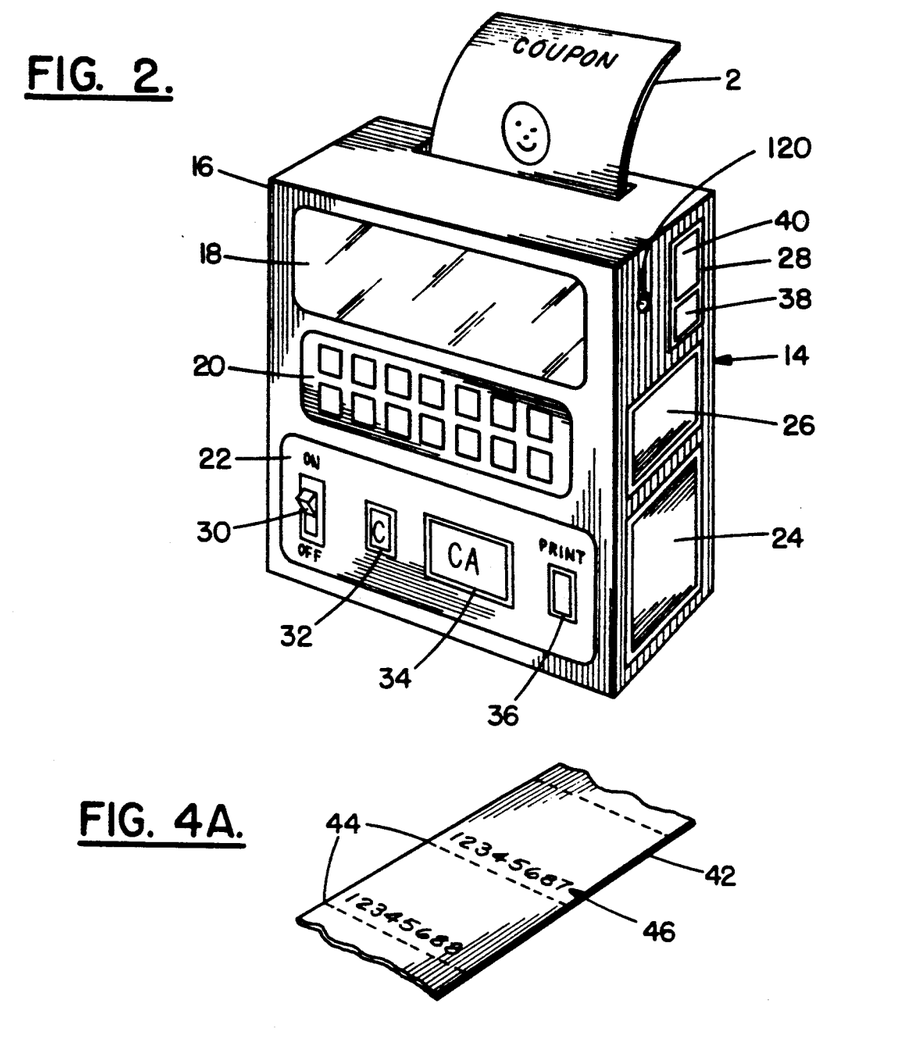
FIG. 2 is a perspective view of one embodiment of a generating unit incorporating features of the present invention.
FIG. 4A is a perspective view of a matrix intended to be used as coupons generated from the generating unit shown in FIG. 2.

Referring also to FIG. 2, each generating unit 14, in the preferred embodiment shown, generally comprises a housing 16, a display screen 18, input keys 20, control keys 22, a replaceable matrix unit 24, a replaceable printer unit 26, a replaceable memory unit 28, a battery power source (not shown), and an electronic controller (not shown). It should be understood that the description of this preferred embodiment of the generating unit 14 is only illustrative. Alternate embodiments of the generating unit may include additional or less features. The generating unit 14 need not have a battery power source, but may alternatively have an electrical cord (not shown) for attachment to a household electrical outlet. In the embodiment shown, the generating unit 14 is generally intended to generate coupons 2 printed on paper. However, it should also be understood that the invention is equally applicable to the creation of other types of tokens, such as magnetic cards. The display screen 18, in the embodiment shown, is an LCD screen and can display information input into input keys 20. However, in an alternate embodiment of the invention, the screen 18 need not be provided. The product information can be provided on a TV screen or, can be provided audibly on a voice channel frequency. The input keys or data entering section 20 permits a TV-viewer 13 to enter product information into the unit 14, such as product names and specifications of a product which the viewer intends to buy in the near future, and verification data. The control keys or control section 22, in the embodiment shown, generally comprise an on/off key 30, a clear key 32, a clear-all key 34, and a print activation key 36. The control keys are suitably connected to the electronic controller (not shown) which is, in turn, connected to the memory unit 28 and printer unit 26. The memory unit 28, in the embodiment shown, generally comprises a first memory section 38 and a second memory section 40. The first memory section 38 is intended to be used as a temporary memory for storing information input at input keys 20 until such time as one of the control keys 22 are used. The temporary memory section 38 has two separate portions, a first single item memory portion and a second single record memory portion. The single item memory portion is intended to store only one type of information at a time, such as product name, product size, or discount value, etc. The single record memory portion is intended to store information for a single record which includes product name, product size, discount value, and verification data, etc. The viewer 13 can input data or information at keys 20 which is stored in the single item memory portion until an enter key is depressed and the information can be transferred to the single record memory portion. Alternatively, the viewer 13 can depress the clear key 32 to delete the information in the single item memory portion, but not affect information in the single record memory portion. Information in the single record memory portion can either be deleted by depressing th clear-all button 34 or depressing the print button 36. If the viewer depresses the print button 36, in addition to printing a coupon 2, the generating unit 14 can also store the printed information in its second memory section 40 for purposes as described below. The cost of the generating unit 14 can be inexpensive because the unit requires no complicated installation, wiring or attachment. The keyboard used as an entry device is not elaborate and may resemble that of a telephone keypad with touch buttons.

Figure 3:
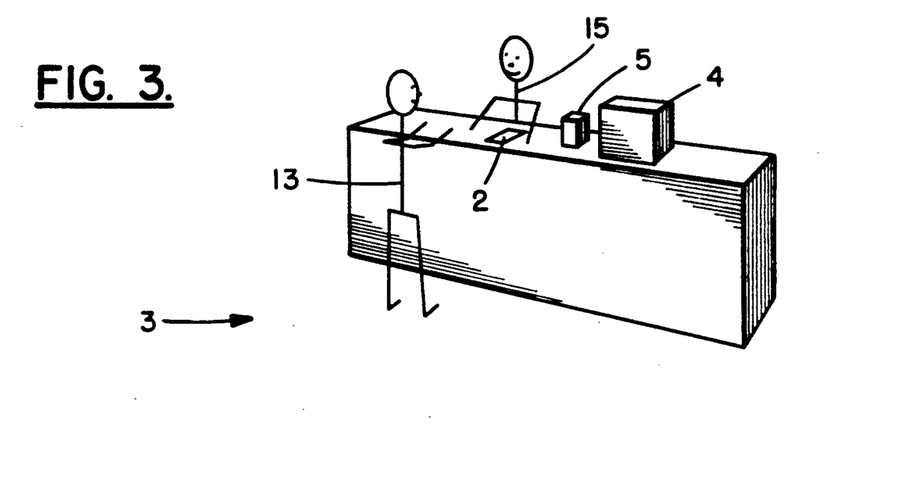
FIG. 3 is an illustrative view of a redemption center for use with a method of the present invention.
Figure 4B:
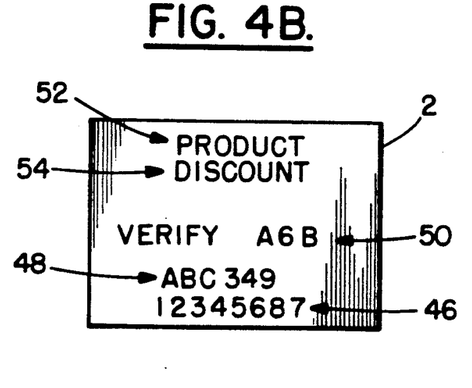
FIG. 4B is a front view of a coupon generated from the generating unit shown in FIG. 2.

When the viewer has entered information into the unit and pressed the print key 36, the printer unit 26 advances a matrix 42 (see FIG. 4A) from the matrix unit 24, prints the information from the single record memory portion onto the matrix, and dispenses the matrix with printed information (a coupon) out of the housing 16. The printing can be accomplished with or without impact using ink sprays, applying heat, magnetic pulses, laser beams, other light sources, providing depressions, or embossed markings. Referring to FIG. 3, the viewer 13 can present the coupon 2 at a redemption center or sales outlet 3 for consideration such as reduction in the purchase price of a product 4 or a free prize 5. While at home, the viewer can select a product in which the viewer is interested and, can use and activate the generating unit so as to print a token or discount coupon specifying such product or merchandise. Normally, the coupon will have printed on it a product indicia line 52 and a discount information line 54 (see FIG. 4B). These product indicia and discount information lines can include coupon redemption information such as places available for redemption, time period for redemption, etc. The employee 15 at the redemption facility 3 can review or authenticate the product indicia line, discount information line, and any other recorded coupon redemption information to verify compliance with predetermined redemption requirements or limits before granting value consideration to the shopper 13. The employee 15 might authenticate by comparing the redemption information to a redemption listing or by entering the redemption information into a computer, such as by a keyboard or bar code reader, which would automatically compare the redemption information on the coupon to a redemption listing or database.

In the course of a television program, viewers can be informed of special sales, discounts, or promotional offers or events which make it attractive to a viewer to utilize coupons reflecting such offers. A number of methods to attract shoppers to sales outlets will now be described. For paper matrix 42 (see FIG. 4A), the matrix preferably has perforations 44, but these need not be provided if the generating unit 14 has a cutter to separate the printed coupon from the matrix. When desired, the matrix sections formed between the perforations 44 are premarked or prenumbered with indicia 46 suitable for use for verification or authentication purposes. However, this indicia 46 need not be provided or alternatively, may be provided by the generating unit 14. Thus, the coupons 2 generated and dispensed by the units 14 normally are prenumbered, such numbers being dissimilar. In an alternate embodiment, the indicia or code 46 may be provided as a machine-readable code. The code can also be provided from a group of markings consisting of numbers, letters, dots, dashes, regular and irregular shapes, codes, symbols and, discrete, connected, and continuous configurations. Utilizing this indicia 46, or parts thereof, an additional prize can be granted. An example would be a "blind" prize payable in cash or merchandise to a shopper who redeems one of the coupons in the course of the purchase of the discounted merchandise. If the indicia 46 on a coupon 2 matches indicia selected by the sponsor of the program, the shopper redeeming the coupon 2 is entitled to an additional prize 5. In a preferred embodiment, the shopper 13 will learn of such a "blind" prize having been won only upon the redemption of the coupon 2. Thus, the method will help to attract shoppers to stores to redeem coupons.

According to another embodiment, a code or "lucky" number 48 is originated by a member of the broadcast audience and shown on the token 2. This method of the invention permits an audience member to select his or her own "lucky" number in the hope that it will match the "lucky" number of the day selected by the sponsor and preferably ascertainable or discernible only upon redemption of the token 2.

In another embodiment, the transmitter or television station 10 also transmits verification data that must be entered into the generating unit 14 which is recorded on the coupon 2 as verification data or indicia 50. This verification indicia 50 can also be used to award "blind prizes". Thus, for example, a prize may be awarded to a shopper whose verification code 50 contains indicia specified and posted at a sales outlet 3 on the day of redemption. According to another method, the host of a TV-program can announce that coupons pertaining to a certain product "will carry a discount in excess of 20%". The shopper will not know how much larger than 20% the discount is until the coupon is redeemed.

The system also provides for a cumulative record being kept, if desired, by the generating unit 14 of all coupons requested by a member of the television audience. This record is compiled and retained in the generating unit in memory 40 and can be made available to sponsors of promotions in different ways. One method of making such coupon generation records available to a sponsor is by retrieving the recorded information from the generating unit 14 by a representative of the advertiser. A preferred method is to take advantage of the shoppers' need to periodically replenish the paper tapes or matrix unit 24 used to produce the coupons in the generating unit. Such paper tapes or matrix units 24 may be available to shoppers in retail stores or other redemption points and, when a shopper receives such a tape, the above mentioned purchase record may be collected from such shopper and made available to the sponsor.

The methods of the invention may permit a combination of measures to prevent forgeries and cheating. The matrix 42 may be of a special composition to make duplication difficult. If the token is to be a paper coupon, the coupons can be prenumbered or provided with other verifiable codes. Numbers or codes can also be transmitted from a central location, which numbers or codes replace or are in addition to the numbers or codes preprinted on the matrix 42. In order to prevent forging and counterfeiting, particularly of more valuable tokens, the token redemption terms can include alphanumeric and/or other indicia or symbols capable of authentication at a redemption center and can include a combination of two separate codes each capable of verification. For example, the information governing the redemption of a token can include a first verification code preprinted on a matrix and a second verification code entered into the generating unit by a shopper in accordance with information transmitted to shoppers by a TV station. The coupons may also have the user's identification preprinted thereon and, for larger prizes, a user may be asked to present identification at the time of redemption.

The system and method described above has the advantage that the generating unit 14 need not be programmed or controlled by external sources such as by electronic signals. The only electronic communication flow is from the central location to the TV-viewers, and the only information input into the generating unit is that entered by a TV-viewer on the input keys 20 or other entry device. The absence of two way communication significantly reduces capital investment and operating costs of the system. However, the system and method could be used with a two way communication system such as when the viewer communicates with the central transmitter station to indicate display or broadcast of product information on a specific product or group of products before using the unit 14 or during use of the unit.

The product information conveyed by electronic signals from a central location 10 may pertain to a single available product or to a plurality of available products, each accompanied by its specification, prize or discount information and, when desired, verification data. A member 13 of the broadcast audience can determine or select a product of interest at that time. If the product information conveyed relates to only one product, and the viewer 13 desires to obtain a token for that product, the user can enter the appropriate product information and verification data into the unit 14 and generate a token. If more than one product is available, the viewer can select the desired product or products and enter the information and data pertaining to the chosen merchandise or services into the unit 14. A single product may be available in different sizes or with different features and specifications in which event shoppers can select the size, feature or specification of their choosing. Alternatively, if the product is of no interest, the audience member may choose to disregard the offer of that product and, in effect, reject it by doing nothing. As used herein, the term "select" therefore is intended to apply also to the act of specifying a single available product for intended purpose, in addition to its more common meaning of selecting from a number of choices.

One method that can be employed may provide for a viewer to originate and specify a product from a class of products. The host of a TV-show may, for example, announce a special code and state that any coupon generated and bearing that code carries with it a predetermined amount of consideration or discount for a predetermined class of products, such as a discount of 30% on any household product. The special code can be combined with a verification code preprinted on the matrix to award large prizes. The combination of the two codes in a predetermined correlation to each other giving entitlement to the large prize. The viewer can generate such a coupon by specifying or entering into the unit a product of his or her own choosing, the announced discount, and the special code. In this manner, viewers can apply such discounts to products of their own choosing from a class of products. Random selection, or otherwise selecting codes in a controlled manner, can be used to give a "lucky" prize to a token redeemer similar to a sweepstakes or lottery with a "lucky" prize winner being ascertainable at either the viewer's remote location and/or a redemption facility.

Although the product specification can originate with the television viewer, the sponsor will frequently prefer to provide on the broadcast the names, prices and specifications of products available for prizes and discounts. In one of the methods, the host of a TV-program can state as part of the redemption terms for a token that a specified store or redemption center will grant a stipulated discount on an identified product or products within a limited period of time. Similar announcements can also be made part of a commercial or promotional message broadcast. The viewer can then select the product, related price or other information to generate a token. The verification or redemption data provided on the token can enable the redemption facility to reject coupons presented after the cutoff data or, coupons which are not for that facility.

The inducement of various kinds of "blind prizes" discernible only at the point of redemption and occasional sweepstake prizes, will ensure greater use and higher redemption rates of coupons. In addition to the product information, discount information and code numbers, the coupons can carry additional preprinted advertising and promotional messages. Advertisers can provide shoppers with predetermined numbers or codes for use in specifying specific products and product information, such as printed tables distributed at sales outlets or on the goods themselves or packaging of the goods. The viewer/shopper can then merely enter the abbreviated number or code for the selected product instead of the entire product information into the unit 14. Thus, a faster entry of product information can be provided.

Figure 5:
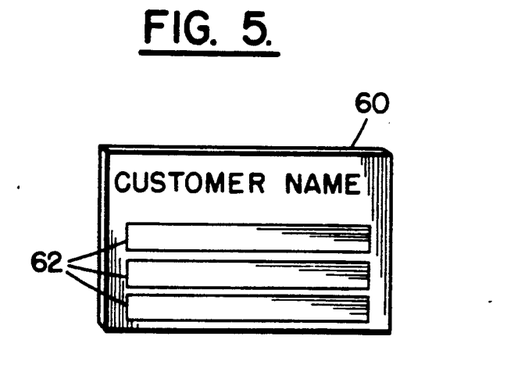
FIG. 5 is a perspective view of an alternate form of matrix to be used with an alternate embodiment of the generating unit shown in FIG. 2.

Although the present invention has been primarily described above with reference to a paper matrix and printed paper coupons, FIG. 5 shows an alternate embodiment of a matrix/coupon. In the embodiment shown, the matrix 60 is comprised of a plastic card having magnetic type strips 62 thereon. The strips 62 can have product information and verification data magnetically recorded thereon which can be read by a suitable reader at the redemption center. For this type of matrix, the generating unit would obviously have a means for magnetically recording information onto the strips 62. Once the card 60 is used as a token it could be returned to the customer with the information on the magnetic strips 62 erased for further use in the future.

After broadcast of product information, the viewer/shopper can either select or not select a product. If a product is selected, a token will only be generated by the viewer/shopper activating the printer by pressing the print button. Until the print button is pressed, no token is generated. Upon pressing the print button a token is generated and its information stored in a memory unit retrieved by the sponsor when the matrix unit is replaced. Once the token is generated, the viewer/shopper can redeem the token by taking it to a redemption facility. If indicia on the token matches predetermined special prize indicia selected by a sponsor, the viewer/shopper also is awarded a "blind prize" in addition to the token's value. The systems and methods described above lend themselves well to the kind of data collection useful to advertisers for the purpose of determining shopping patterns of TV viewers. A number of data collection methods will now be described.

The token generating units can be provided with individual serial numbers. When desired, the printer can be equipped with permanent means for printing a viewer/shopper's name on every coupon, thus providing additional and verifiable identification. When a unit is sold or leased to the member of a household who is a potential shopper, the identity of that individual for that unit can be recorded. Thus, the coupons dispensed by that generating unit can print the serial number on the coupon and be traced back to and associated with the individual or household. Over a period of time the buying habits or patterns of that shopper or household can emerge by reviewing the redeemed tokens. When a generating unit is to be placed in a household comprising several members, particulars of the entire family can thus be elicited and recorded.

In addition to the above method, an identification card containing the user's name and the serial number of the generating unit can also be issued to the individual who buys or leases the unit. This card may be required for presentation and authentication when a large or sweepstake prize is claimed. The aforementioned cumulative record of all coupons requested by and dispensed to a shopper also can be used to create a demographic database. If, for example, a paper tape forms the matrix for 100 coupons, a sponsor, upon receipt of the cumulative record, has a ready made list of purchases expressed in percent for each product category.

Another method of awarding a blind prize or additional prizes can include the situation when a token generated by the unit 14 and a preprinted coupon, such as those found in newspapers and the like, are both presented for redemption at a redemption facility. In this method of the invention, the token could have a first code and the preprinted coupon a second code, such as machine-readable bar codes. In the event that both codes match, or at least partially have a predetermined correlation, the viewer/shopper would be entitled to the additional prize or a blind prize. Another method might include using a preprinted coupon as the matrix for a token. This method would include giving consideration in the form of a prize and/or discount to a redeemer upon redemption of such a combined coupon/token including both the value of the preprinted coupon and the value of the product discount entered into the generating unit and printed on the preprinted coupon. An additional prize or consideration for such a combined coupon/token might also be given.

Another system and method might include the transmission or broadcast by the central station 10 of a machine-readable signal and providing the generating unit with means for reading the signal. This machine-readable signal can be transmitted concurrently with the normal audio and visual signals, such as during a television commercial. If the viewer desires to purchase the product being advertised or desires access to the specific product information being transmitted in the machine-readable signal, the viewer would only need to press a button on the generating unit; either a print button or a view button. The generating unit could then either print a token or display the product information. If the product information was merely displayed, the viewer can either clear the displayed product information if a token is not desired or, print a token for that product. Another method might include transmissions over an extra television channel or several television channels which constantly update listings of product information. It might also be possible for viewers to call up categories most to their desire such as detergent, furniture polish, etc.

Figure 6:
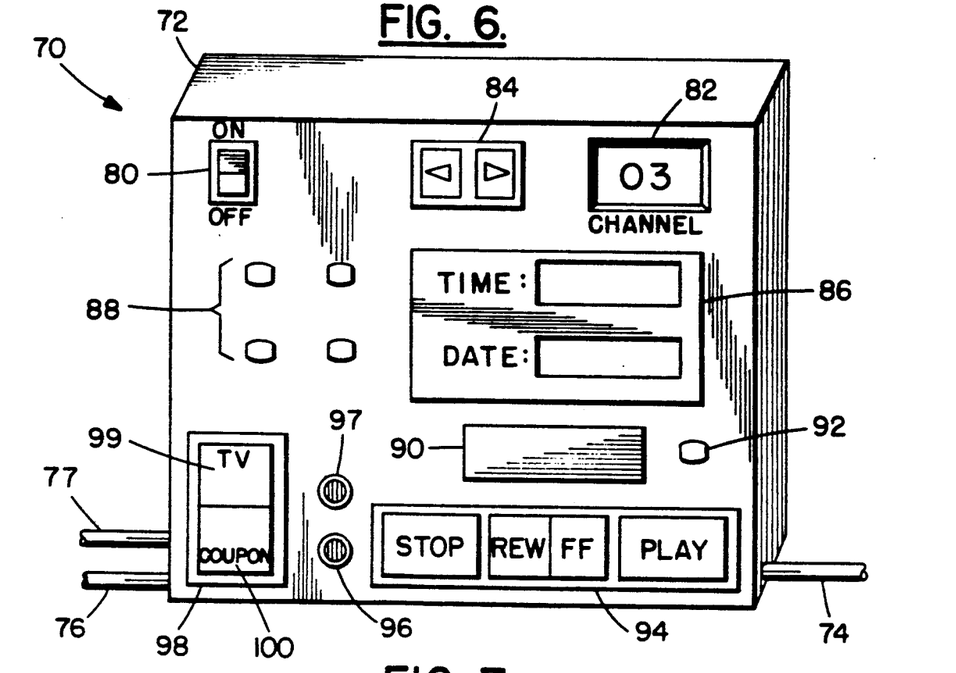
FIG. 6 is a front perspective vie of an apparatus for receiving and storing product information signals.

In the embodiment of the system shown in FIG. 1, the system also includes an apparatus 70 for receiving and storing product information signals. Referring also to FIG. 6, a perspective front view of the apparatus 70 is shown. The apparatus 70 generally comprises a housing 72 with various controls 106 (see FIG. 7) connected to the housing 72 and electronic circuitry located inside the housing. The apparatus 70 includes an electrical cord 74 adapted to be plugged into an electrical outlet to supply power to the apparatus 70. A battery power supply could also be provided. The apparatus 70 also includes suitable terminals 110 and 111 (See FIG. 7) to allow transmission cables 76 and 77 to be connected thereto. The first cable 76 is connected to the antenna 78 (see FIG. 1). The second cable 77 is connected to terminals of the television 12. The controls 106 of the apparatus 70 generally include an ON/OFF switch 80, a channel display 82 and channel selector keys 84, a time and date display 86, time and date selector keys 88, a sensor 90 to be used with a wireless remote control device (not shown), a record control button 92, control play buttons 94, input terminal 96, output terminal 97, and a switching control 98 with TV button 99 and product information button 100. However, it should be understood that any suitable type of controls could be provided.

Figure 7:
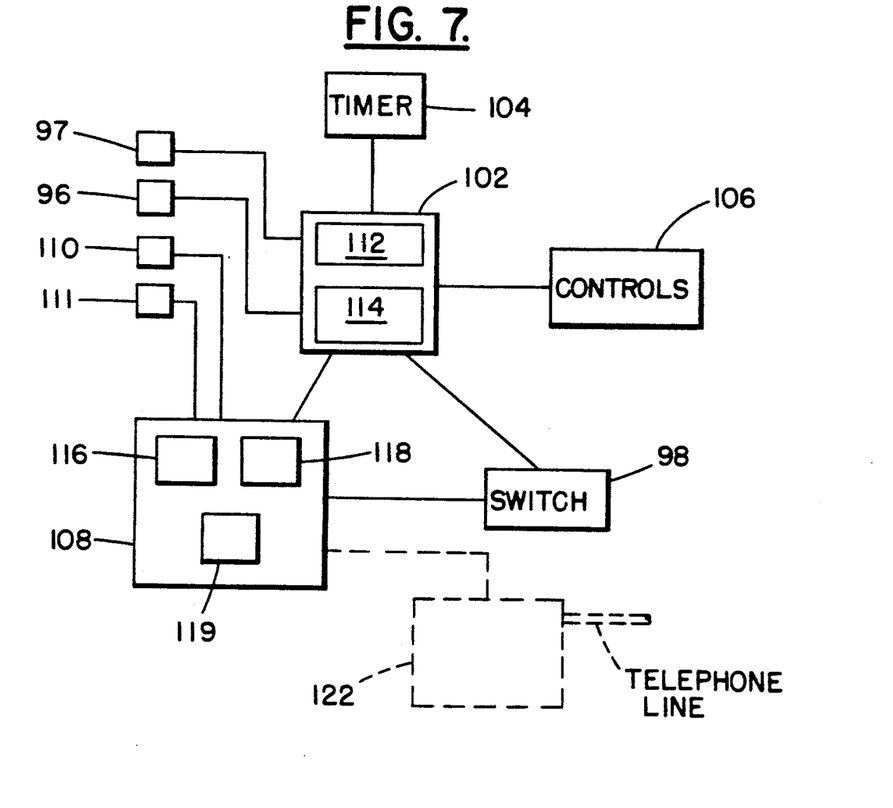
FIG. 7 is a schematic view of the electronics used in the apparatus shown in FIG. 6.

Referring also to FIG. 7, a schematic view of the electronic circuitry located inside the housing 72 is shown. The electronic circuitry generally includes a controller 102, a clock/timer 104, the controls 106 described above, a receiving and storage device 108, input terminal 110, output terminal 111, input terminal 96, and output terminal 97. The controller 102 generally comprises a memory 112 and a microprocessor 114. The memory may include any suitable type of memory or memories including Read Only Memory (ROM), Random Access Memory (RAM), Programmable Read Only Memory (PROM), DRAM, etc. The receiving and storage device 108 generally comprises a receiver 116 and a recorder/player 118. The receiver 116 is generally adapted to receive broadcast transmissions, via the antenna 78, from the transmitter 10. The recorder/player 118, in the embodiment shown, is generally adapted to record signals received at the receiver 116 and adapted to play back recorded signals. The recording medium can include any suitable type of recording device, such as video or audio tape. Alternatively, the recorder/player 118 may be replaced by a suitable connection to an external recorder/player, such as a VCR.

Operation of the apparatus 70 is relatively simple. Broadcast signals or live transmission signals from the transmitter 10 are picked up by the antenna 78. These broadcast signals can include television program signals with product information signals. The product information signals may be transmitted along a subcarrier of the television program signals or on a totally separate frequency. Signals received at the antenna 78 are transmitted to the apparatus 70 by means of the transmission cable 76 and received at terminal 110. The signals are then transmitted to the receiving and storage device 108. The device 108, among other things, is generally adapted to transmit signals to the output terminal 111 and to the television 12 via the transmission cable 77. However, the signals transmitted to the television 12 may not include both the television program and product information signals. The device 108 is adapted to either allow the television program signals to be transmitted to output terminal 111 or be blocked from the output terminal 111. In addition, the product information signals received at the device 108 can be transmitted to the output terminal 111, either alone or concurrently with the television program signals, or blocked from transmission to the output terminal, and can be recorded by the recorder/player 118 and played back at a later time. In the embodiment shown, if the TV button 99 is depressed, television program signals are sent to the television 12, but the product information signals are not sent to the television 12. If the product information button 100 is depressed, the product information signals are sent to the television 12, but the television program signals are not sent to the television. If both buttons 99 and 100 are depressed, both the television program signals and the product information signals are sent to the television and displayed or broadcast simultaneously, such as on a split screen display. For such simultaneous display a suitable audio control switch (not shown) may be provided to switch between audio signals of the two displays.

In addition to display of the live signals mentioned above, the apparatus 70 is also adapted to transmit stored product information signals to the output terminal 111. Recording of the product information signals may be activated manually by depressing record button 92 or by use of the timer 104 and keys 84 and 88 to establish a date, time and channel for automatic recording of product information signals. A wireless remote control (not shown) might also be used with sensor 90 to set up recording parameters. When the device 108 records, it records only product information signals; not television program signals. However, in an alternate embodiment, the device 108 may record both product information signals and television program signals with the user then using buttons 99 and 100 during playback to display either or both of the signals. In the preferred embodiment, the user merely plays back the recorded product information signals by depressing the PLAY button of the control play buttons 94. Alternatively a wireless remote control (not shown) could be used. Of course, the rewind (REW) and forward fast (FF) buttons could be used to advance the recording to desired portions of the recorded signals. When the PLAY button is depressed, the device 108 transmits recorded product information signals to the output terminal 111. Preferably, both of the live television program signals and live product information signals are stopped or stored at the device 108 while the stored product information signals are being played back. However, in a preferred embodiment, the TV button 99 and/or the product information button 100 may be depressed to also display live broadcast signals simultaneously with the recorded signals. Of course, any suitable type of live/recorded displays could be provided.

The input terminal 96 is connected to the controller 102 and is generally provided such that an input device, such as a bar code reader or key pad can be connected to the apparatus 70. The input device can be used to input predetermined record times, dates, channels and lengths into the controller 102. Such predetermined data is presently published in television magazines with television listings in code. These codes could be input into the apparatus 70, by use of the input device, in order to quickly set up recording features of the apparatus by use of keys 84 and 88. In addition, the input device could be used to read bar codes of products that the user presently purchases and input this information into the controller such that when the controller 102 senses a live product information signals broadcast corresponding to the entered product, the controller 102 automatically activates the device 108 to record the product information signal. In the embodiment shown, the device 108 includes a data comparison device 119. The data comparison device 119 is connected to the receiver 116 and the controller 102. The data comparison device 119 is adapted to monitor live produce information signals and compare these signals, or specific portions of these signals, to predetermined data recorded in the controller 102. Upon correlation of the predetermined data with a live product information signal, the data comparison device 119 can signal the controller of this event. The controller 102 can then automatically activate or deactivate the recorder/player 118. This can automatically allow for recording of product information signals for user-specified products without the viewer having to watch live product information signal broadcasts, or ever be home. In one method of this type of embodiment, the product information signals for each product may include an identifier code signal that precedes the rest of the product information signal for the product. Thus, the identifier code signal can be used to trigger the data comparison device 119. Of course, any suitable type of input device could be used for any suitable type of purpose.

In the operation of another type of system, a sponsor can provide shoppers with a printed list of products available from the sponsor, some of which may be promoted by discounting or otherwise featured from time to time, the time of such promotion not being known to shoppers. Product information on said list is numbered or coded. As an example, a seller may designate the beverage group as A, all soda waters as A-1 and the brand of soda water known as "Club Soda" as A-1-3. Thus, any product can quickly and easily be identified. A shopper can select from the list a product needed at the time and targeted for purchase on the next shopping trip.

The unit 14 can be suitably connected to the receiver 116 and the data comparison device 119 or, may have its own receiver and data comparison device. The shopper enters the listed number or code of the selected product in unit 14 and the number or code is stored in memory unit 28. Additional product identifications may similarly be stored.

When the needed product or products, whose identifications have been stored in unit 14, are promoted by the seller through discounting or otherwise featured, the product numbers or codes are transmitted from a central station to unit 14 and stored in memory 28 or 112. Sensors in comparing means 119 or in the unit 14 detect a match in numbers and/or codes between a sponsor's featured product identification and a shopper's entered product identification. Upon the occurrence of such a match, the comparing means activate the printer of unit 14 to generate a coupon for the needed and featured product. Such coupons can be generated in the absence of the shopper. Thus, the recorder/player 118 need not be provided.

The output terminal 97 is also connected to the controller 102 and is generally provided such that the coupon generating unit 14 can be connected to the apparatus 70, such as by means of an electrical cable (not shown). The coupon generating unit 14 includes a terminal 120 (see FIG. 2) such that the electrical cable (not shown) can be connected to the unit 14. The terminal 120 is preferably connected to the memory unit 28. Connection of the unit 14 to the apparatus 70 allows product information signals received at the apparatus 70 to be transmitted directly to the unit 14. Such an embodiment would alleviate the necessity of the user having to enter product information into the unit 14 merely by means of input keys 20. Of course, it should be understood that wireless transmission of the product information from the apparatus 70 to the unit 14 could be used. In addition, the coupon generating unit could be provided with the apparatus 70 as single unit. The apparatus 70 could also be provided as a single unit with a television and/or VCR.

One of the advantages of the present invention is that the television need not be on and the viewer does not need to view live product information in order to produce product coupons. This can obviously save a considerable amount of viewing time for the viewer while still providing the same number of product coupons. Apparatus 70 can alternatively or additionally be equipped with means 122 for receiving electronic signals over telephone wires conveying product information. Recent developments in telephonic signal transmission technology permit transmitting signals of graphic and television quality over telephone wires. In such an embodiment, the apparatus 70 can include known means for receiving such signals and for storing them. When activated, the apparatus 70 can transmit the signals to the television as herein disclosed.

Product information signals can be received by and stored in apparatus 70 as follows. When a seller, such as a supermarket, wishes to list and promote a number of discounted products, the seller employs a well known telemarketing technique in which a large number of prerecorded messages are transmitted over telephone wires to telephones at selected numbers. These messages alert TV viewers to the fact that new or additional product information has been formatted and is available by activating transmitting means in apparatus 70. The alerting can be performed through any suitable signal means, such as lights, sounds or displays on the television. A viewer interested in receiving the latest product information can then display the product listing transmitted by apparatus 70 to the television receiver 12.

Alternatively, a telephone subscriber can dial a designated number, such as a 800 or 900 number. The call can be an automatic request and command to transmit product information over telephone wires to apparatus 70. Thus a single telephone call, which can be made by touching a few buttons on a telephone keypad, conveys a product information request to a central location by individual subscribers and triggers a flow of product information to the subscriber from a central transmitting facility.

This type of method minimizes the time required for transmission of product information because a shopper, having requested the information, will expect the same, will act on the same more quickly, and will not require a lengthy display of the product information on the television, detracting from the television entertainment viewing. The present invention also allows long wavelength transmissions to be used to broadcast the product information signals with the apparatus 70 playing back recorded signals at a faster rate than live signals. The present invention obviously makes remote coupon generating much more user-configured and, thus, should increase user participation over mere live broadcast systems.

Let it be understood that the the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A system for generating product coupons comprising:
    means, at a central location, for transmitting electronic signals to remote locations of members of a broadcast audience, the signals including product information signals and television program signals;
    a television at each of the remote locations for presenting product information and television programs;
    an apparatus for receiving and storing product information signals, the apparatus being connected to the television and comprising means for receiving the product information signals, means for storing received product information signals, and means for selectively transmitting stored product information signals to the television, the means for selectively transmitting being selectively operable by individual members of the broadcast audience; and
    a coupon generating unit at each of the remote locations, the unit comprising means for selectively entering product information and means for dispensing product coupons having at least a portion of the selectively entered product information thereon.

2. A system as in claim 1 wherein the means for selectively transmitting stored product information signals also includes means for selectively interrupting reception of television program signals by the television.

3. A system as in claim 1 wherein the apparatus further comprises means for selectively transmitting live signals conveying product information to the television.

4. A system as in claim 1 wherein the system further comprises means for directly transmitting product information from the apparatus to the coupon generating unit.

5. A system as in claim 1 wherein the apparatus includes means for simultaneously transmitting both television program signals and stored product information signals to the television for display of both a television program and product information on the television at the same time.

6. A system as in claim 1 wherein the apparatus includes means for automatically selectively storing product information signals based upon predetermined information.

7. A system as in claim 6 wherein the apparatus includes means for comparing a portion of a live signal conveying product information to a predetermined product information signal and, upon correlation of at least a portion of the live and predetermined product information signals automatically store the live signals conveying product information.

8. A system as in claim 6 wherein the apparatus includes means for inputting at least a portion of predetermined product information signals into the apparatus.

9. A system for generating product coupons, the system comprising:
    a television located at a remote location;
    means, located at the remote location, for receiving electronic product information signals transmitted from a central location;
    a storage device connected to the means for receiving, the storage device having means for storing product information signals received at the means for receiving;
    means for selectively transmitting stored signals from the storage device to the television for display on the television; and
    a coupon generating unit at the remote location for generating coupons, the unit having means for selectively entering product information therein that is displayed on the television and for generating the coupons with at least a portion of the product information thereon that has been entered into the unit.

10. A system as in claim 9 further comprising means for selectively switching transmission of stored signals and live signals conveying product information to the television.

11. A system as in claim 9 wherein the means for selectively transmitting stored signals to the television includes means for simultaneously displaying stored signals on a first portion of a screen of the television and a television program on a second portion of the television screen.

12. A system as in claim 9 further comprising means for transmitting at least a portion of the stored product information signals directly to the coupon generating unit in conjunction with transmission to the television.

13. A system as in claim 9 further comprising means for inputting predetermined product information comparison data into a memory of a comparison device connected to the means for receiving, the comparison device being adapted to compare the input predetermined comparison data to live product information signals.

14. A system as in claim 9, wherein said receiving means is adapted to receive product information signals transmitted over telephone wires.

15. A system as in claim 13 wherein the comparison device includes means for automatically activating the storage device upon correlation of a portion of the comparison data with the live signals conveying product information.

16. A system for selectively generating product coupons, the system comprising:
   means for receiving and storing electronic product information signals transmitted from a central location, the means for receiving and storing being located at a remote location with a television;
   means, operable by a viewer of the television, for selectively transmitting said product information signals stored in said means for receiving and storing to the television for presenting to the viewer; and
   a coupon generating unit at the remote location, the unit having means for selectively entering product information presented on the television to the viewer therein and dispensing product coupons with the selectively entered product information thereon.

17. A system as in claims 16, wherein said means for receiving electronic product information signals includes a television signal receiving means.

18. A system as in claims 15, 16 or 17, wherein said means for receiving electronic product information signals includes a radio signal receiving means.

19. A system as in claims 15, 16 or 17, wherein said means for receiving electronic product information signals includes a telephone signal receiving means.

20. A system for generating product coupons for products intended for purchase, the system comprising:
   means, located at a remote location, for inputting and storing a product identification code, the code identifying a product intended for purchase;
   means, at the remote location, for receiving electronically transmitted product information signals from a central location, said information signals pertaining to products available for purchase;
   means for comparing the stored product identification code to at least a portion of the product information signals; and
   means, located at the remote location, for automatically generating a product coupon based upon a predetermined correlation between the stored product identification code and the product information signals, the means for automatically generating being adapted to generate product coupons with at least a portion of the product information code recorded thereon.

21. A system for displaying product information and for generating product coupons, the system comprising:
   means, at a central location, for transmitting electronic signals including product information to members of a remote broadcast audience;
   means, at a central location, for transmitting electronic signals including a television program to said members;
   means at said members' remote locations for receiving and storing said product information signals;
   a television receiver at each of said remote locations having means for displaying a television program and product information;
   switching means at each of said remote locations, operable by individual ones of said members, for selectively displaying a television program or said stored product information on said television receiver;
   means, operable by an individual one of said members, for selectively entering product information;
   coupon generating means connected to said selected product information entering means, said generating means including:
      storing means for at least a portion of said selectively entered product information;
      a removable matrix adapted to record information thereon;
      means operable by individual ones of said members for recording on said matrix at least a portion of said entered product information; and
      means for generating from said matrix a coupon having at least a portion of said selected product information recorded thereon.

22. A system as in claim 1 including:
   means, at a central location, for transmitting electronic product information signals over telephone communication means, and
   means in said apparatus for receiving said telephonic product information signals.

23. A method of recording product information signals comprising steps of:
   transmitting product information signals from a central location to remote locations, the product information signals including an identifier code;
   providing, at least at one of the remote locations, a system for receiving and storing transmitted product information signals and, for inputting predetermined identifier codes; and
   automatically activating the system to record transmitted product information signals upon the identifier code transmitted with the signals corresponding to a predetermined identifier code previously input and stored in the system such that when a user of the system inputs a predetermined identifier code into the system, the system automatically activates and records product information signals when the system senses a correspondence between the input code previously stored in the system and the identifier code transmitted with the product information signals.

24. A method of displaying product information signals at remote locations, the method comprising steps of:
   transmitting electronic product information signals from a central location to the remote locations;
   providing, at the remote locations, a system for automatically receiving and storing transmitted product information signals, the system including means for signaling people that transmitted signals have been received and stored, means for inputting an activation code, and means for activating the storing of transmitted signals upon at least a portion of the transmitted signals matching the activation code;

automatically receiving and storing transmitted product information signals by the system upon at least a portion of the transmitted signals matching the activation code;

signaling people, at least at one of the remote locations, by the means for signaling that product information signals have been recorded by their system; and activating the system, by a person at the remote location, to display recorded signals.

25. A method of recording and displaying information signals comprising steps of:

providing a system at a remote location for recording product information signals conveyed over a telephone line and, for displaying the signals on a television at the remote location;

a person, at the remote location, contacting a central location by means of a telephone and entering a code;

transmitting product information signals from the central location to the remote location over telephone wires in response to entering of the code;

recording the transmitted product information signals at the remote location on the system; and displaying the recorded signals on the television at the remote location.

26. A method for generating tokens comprising steps of:

electronically transmitting program signals and product data signals from a central location;

providing an apparatus at remote locations for generating a token, the apparatus generating tokens with the product data thereon that has been input to the apparatus;

providing members of an audience with a list of identification data of products;

entering selected identification data from the list by at least one of the members of the audience into a storage device at the member's remote location, the device having means for storing entered identification data and comparison means;

receiving the transmitted signals at least at some of the remote locations;

automatically comparing received product data signals to stored identification data by the comparison means; and automatically storing select received product data signals in the storage device upon the comparison means detecting a predetermined correlation between the received product data signals and the stored identification data.

27. A method for generating coupons comprising steps of:

electronically transmitting program signals and product data signals from a central location;

providing an apparatus at remote locations for generating coupons, each apparatus comprising means for entering product data, means for storing entered product data, comparison means, and means for generating coupons with entered product data thereon;

providing members of an audience with a list of identification data of products;

entering selected identification data from the list, by at least one of the members of the audience, into the apparatus at the member's remote location, the entered identification data being stored in the means for storing;

receiving the transmitted signals at least at some of the remote locations;

automatically comparing received product data signals to stored identification data by the comparison means; and generating a coupon from the apparatus having at least a portion of the received product data signals recorded thereon when the received product data signals correspond to the stored identification data.

28. A method as in claims 26 or 27 wherein the step of electronically transmitting comprises transmitting the product data signals on a sub-carrier of the program signals.

29. A method as in claims 26 or 27 wherein the step of electronically transmitting comprises transmitting the product data signals on a frequency separate from a frequency of the transmission of the program signals.

30. A method as in claims 26 or 27 wherein the apparatus comprises means for compiling a cumulative record of predetermined activity of the generating apparatus.

31. A method as in claims 26 or 27 further comprising providing forgery preventive steps including storing a verification code into the generating apparatus and the code being printed by the generating apparatus when product data signals are printed.

* * * * *